US008579695B1

(12) United States Patent
Torres

(10) Patent No.: US 8,579,695 B1
(45) Date of Patent: Nov. 12, 2013

(54) CLASS II GAMING SYSTEM AND METHOD

(75) Inventor: Jared A. Torres, Duluth, GA (US)

(73) Assignee: Cadillac Jack, Duluth, GA (US)

( * ) Notice: Subject to any disclaimer, the term of this patent is extended or adjusted under 35 U.S.C. 154(b) by 224 days.

(21) Appl. No.: 12/913,150

(22) Filed: Oct. 27, 2010

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/19; 463/15; 463/16; 463/18; 463/20; 463/21; 463/22; 463/25; 273/292

(58) Field of Classification Search
USPC ............ 463/15, 16, 18–22, 25; 273/143, 292
See application file for complete search history.

(56) References Cited

U.S. PATENT DOCUMENTS 6,277,025 B1 * 8/2001 Margolin ........................ 463/18
6,537,150 B1 3/2003 Luciano et al.
6,569,017 B2 5/2003 Enzminger et al.
7,316,612 B2 1/2008 Odom
7,416,484 B1 8/2008 Nelson et al.
7,470,183 B2 12/2008 Wishart
2005/0059468 A1 * 3/2005 Cannon ........................... 463/19
2005/0059471 A1 * 3/2005 Cannon ........................... 463/19
2005/0075161 A1 * 4/2005 McGlone et al. ............... 463/19
2005/0250572 A1 * 11/2005 Kane et al. ...................... 463/17
2007/0117608 A1 5/2007 Roper
2007/0155472 A1 7/2007 Gail et al.
2009/0036194 A1 2/2009 Naicker
2009/0075715 A1 3/2009 Coleman

* cited by examiner

*Primary Examiner* — Omkar Deodhar
*Assistant Examiner* — Adetokunbo O Torimiro

(57) ABSTRACT

A video-based gaming device and method of using the same. The gaming device includes a primary game configured to present a game of chance wherein outcomes of the game of chance are based on bingo ball draws and patterns formed on bingo cards, and a bonus game activated by certain pre-established primary game outcomes wherein the bonus game presents one or more bonus game icons each associated with a separate bonus game award from a set of bonus game awards wherein each bonus game award is determined by mapping a set of bonus game patterns to the set of bonus game awards by an order that the bonus game patterns forming the set of bonus game patterns are achieved by applying an original ball draw, in an order bingo balls were originally drawn, to an original bingo card, and randomly assigning the bonus game patterns to the bonus game icons.

7 Claims, 7 Drawing Sheets

CLASS II GAMING SYSTEM AND METHOD

FIELD OF THE INVENTION

The embodiments of the present invention relate to class II electronic games of chance having bonus games associated therewith.

BACKGROUND

Class II games of chance are conventionally driven by bingo ball draws and associated outcomes. Class II games of chance are normally placed in states prohibiting the more popular class III games of chance (e.g., slot machines using random number generators). There are approximately 40,000 class II gaming stations operating in purely class II jurisdictions. While class II games of chance are suitable for their desired purpose, there is always a need for more exciting and versatile versions of class II games of chance to maintain the interest of players.

To that end, the embodiments of the present invention provide a class II game of chance having a bonus game wherein the outcome is random rather than pre-determined as with current class II games of chance.

SUMMARY

In a first embodiment of the present invention, a pick type bonus game provides a player with a plurality of bonus game icons from which to select wherein the bonus game icons selected determine bonus game awards. The bonus game awards are matched to bonus bingo patterns by the bingo ball draw which advanced the player to the bonus game. The bingo ball draw is compared to the bingo card which advanced the player to the bonus game such that the order that the bonus bingo patterns are won determines the bonus bingo patterns' award. In this manner, the bonus game awards are randomly determined.

The embodiments of the present invention are suitable for various types of class II bonus games including, but not limited to, pick type bonus games, wheel type bonus games and race type bonus games.

Other variations, embodiments and features of the present invention will become evident from the following detailed description, drawings and claims.

DETAILED DESCRIPTION

Figure 1:
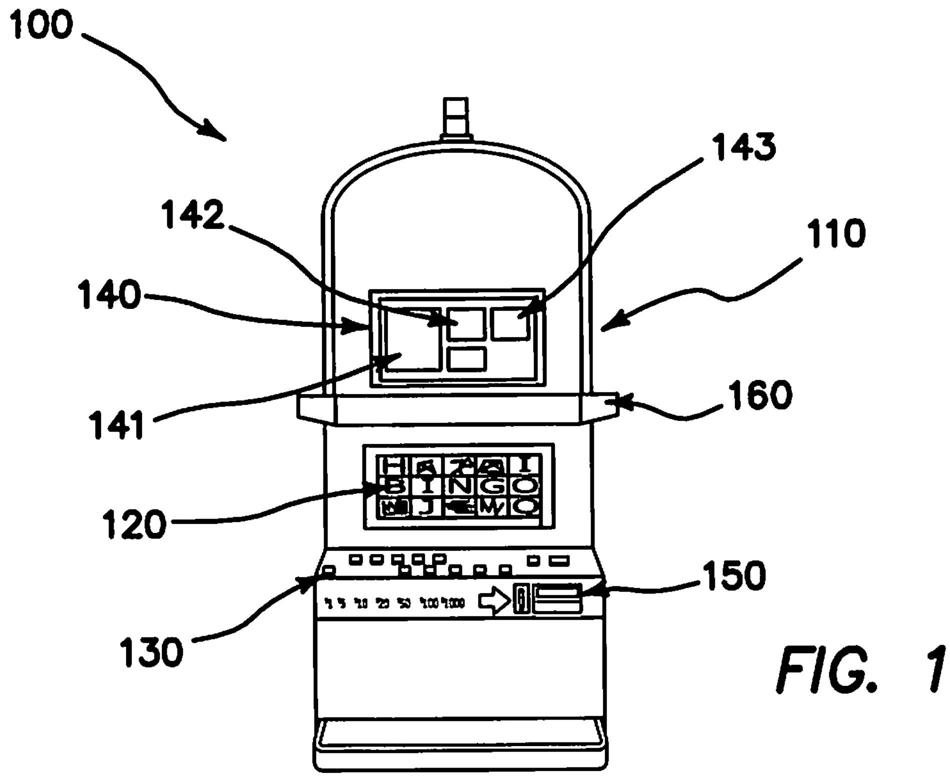
FIG. 1 illustrates a class II bingo gaming machine of the type which may facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Class II machines, or "player interface stations," differ from Class III devices in that the player interface station or terminal is a technological aid to the playing of bingo. Players compete against each other in a bingo game as opposed to playing against the machine as with Class III machines. The bingo game itself is powered by an independent system, with the machines functioning as terminals for bingo play. The machines are linked to the independent system which determines each player's outcomes. Players view the bingo game at the class II machine's display while a graphical representation of the bingo game's outcome is displayed as a game of chance (e.g., reel game).

Initial reference is made to FIG. 1 illustrating a class II machine or player interface station 100. The machine 100 comprises a cabinet 110, reel game video display 120, player interface buttons 130 and bingo game/bonus game video display 140. The bingo game/bonus game video display 140 displays the player's bingo card 141, ball draw 142 and corresponding bingo card pattern 143. Optional features include a ticket-in ticket-out device 150, speakers 160 and player tracking card interface (not shown).

The machine 100, along with multiple others, is linked to a central computer system configured to control bingo ball draws which determine machine outcomes. A bingo ball draw is compared to the bingo card associated with each machine to create bingo card patterns which determine the machine's outcome for that play. The bingo ball draws are randomly conducted in a conventional manner by the central computer system. More specifically, the outcomes of the bingo ball draws are reflected in reel game outcome commensurate with the value of the pattern obtained on a subject bingo card. That is, the bingo ball draws drive the reel game outcomes to provide the appearance that the reel game is randomly determined although the reel game outcomes are predetermined by the bingo ball draw and corresponding bingo card patterns. Other non-slot primary games may also be driven by the bingo ball draws and associated bingo card patterns formed thereby.

Conventionally, certain bingo ball patterns advance the player to a bonus game also driven by the original bingo ball draws. With such a conventional system, the original bingo ball draw may provide for a 500 unit win which covers the original game award and bonus game award. For example, 400 units may be attributed to the reel game and 100 units to the bonus game. The bonus game award is thus determined prior to the play of the bonus game. A wide variety of bonus games are possible including pick type, wheel type and race type. Regardless of the bonus game type, as set forth above the bonus game award is determined in advance.

With the embodiments of the present invention, the bonus game award is determined during the play of the bonus game rather than in advance. Moreover, the bonus game awards are randomly determined by the original bingo ball draw and corresponding bonus game patterns (e.g., line, diagonal or four corners) formed on the original bingo card that advanced the player to the bonus game.

Figure 2A:
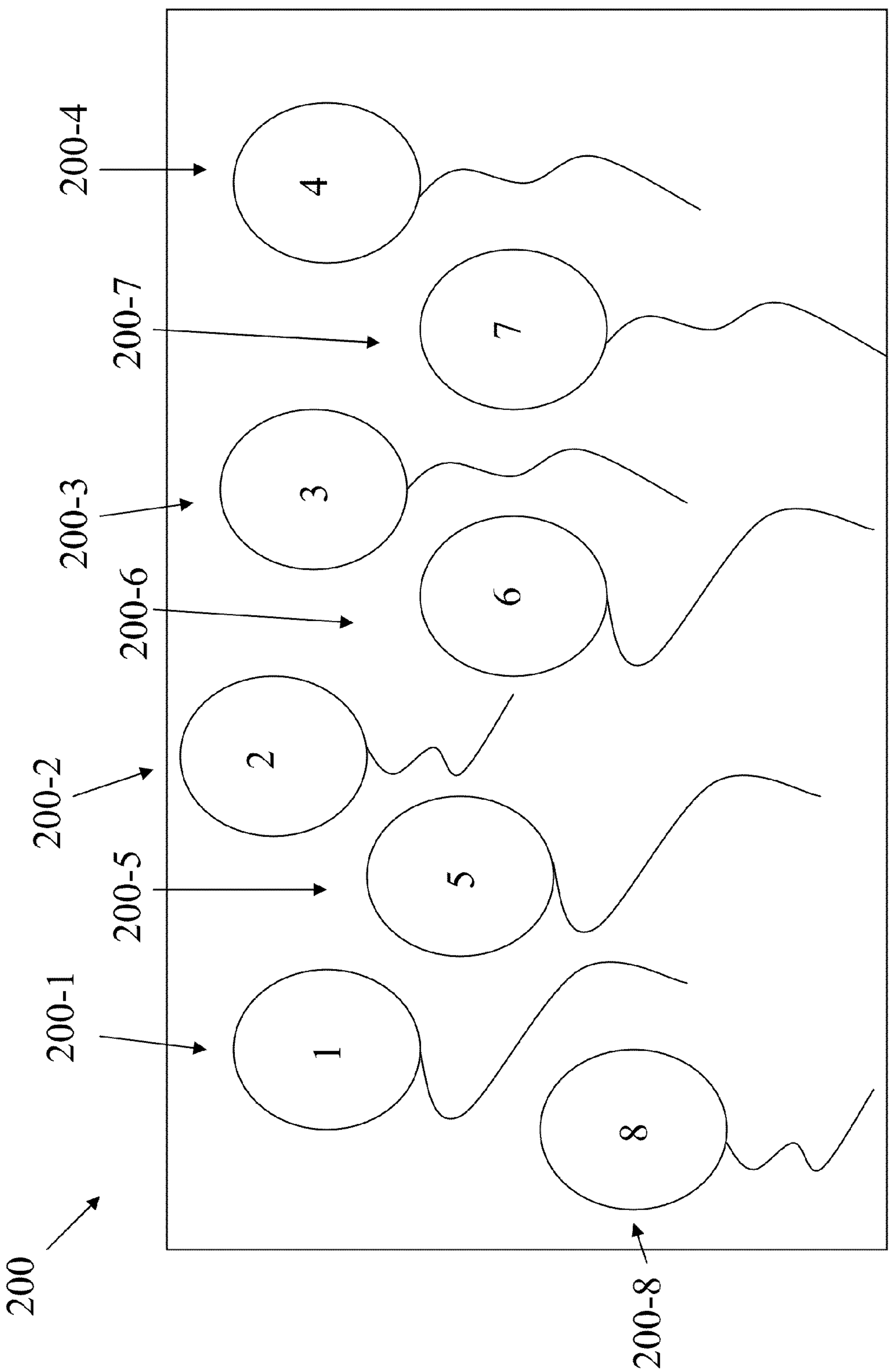
FIGS. 2*a*-2*d* illustrates an exemplary bonus game display according to the embodiments of the present invention.
Figure 2B:
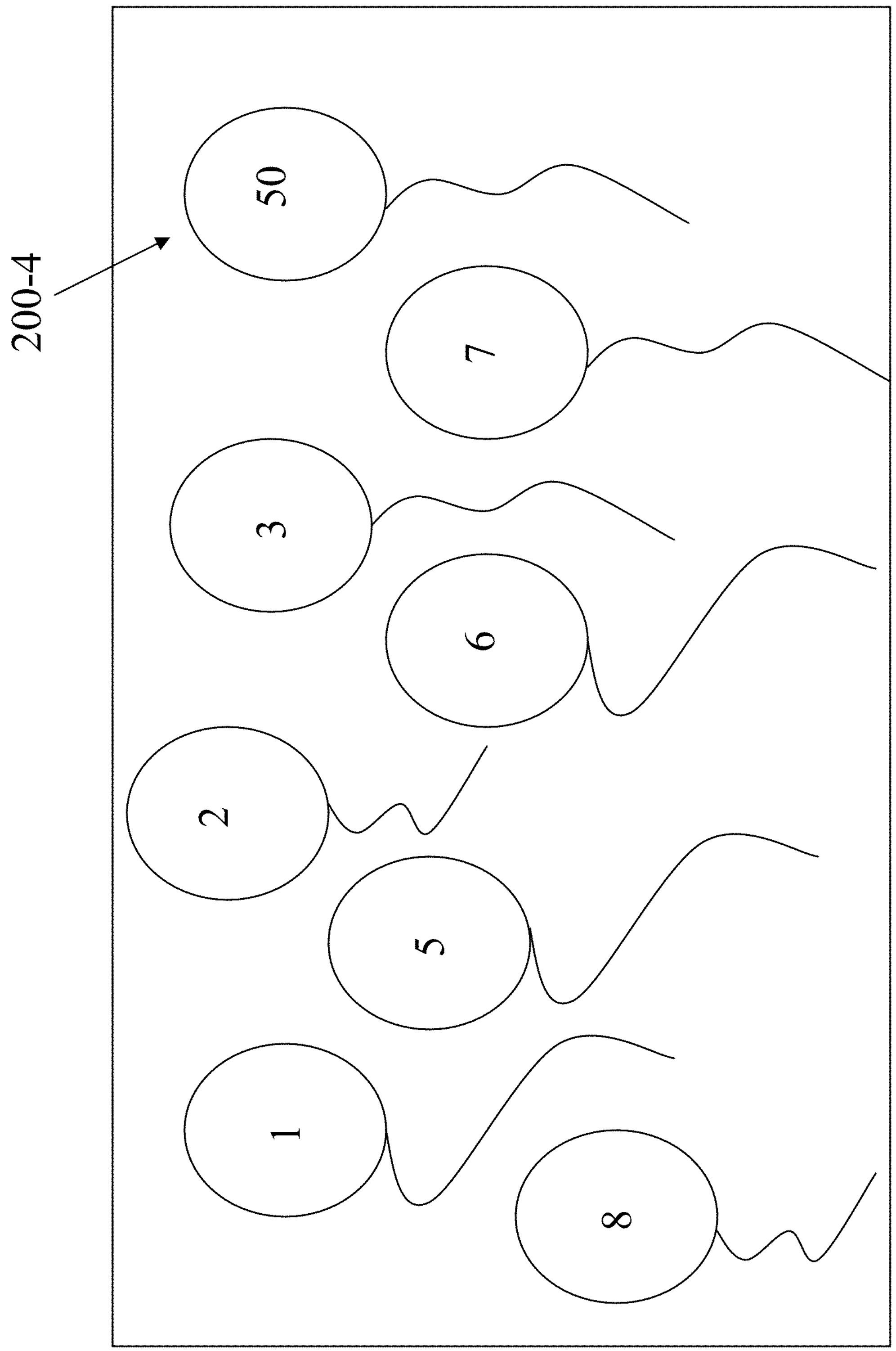
Figure 4:
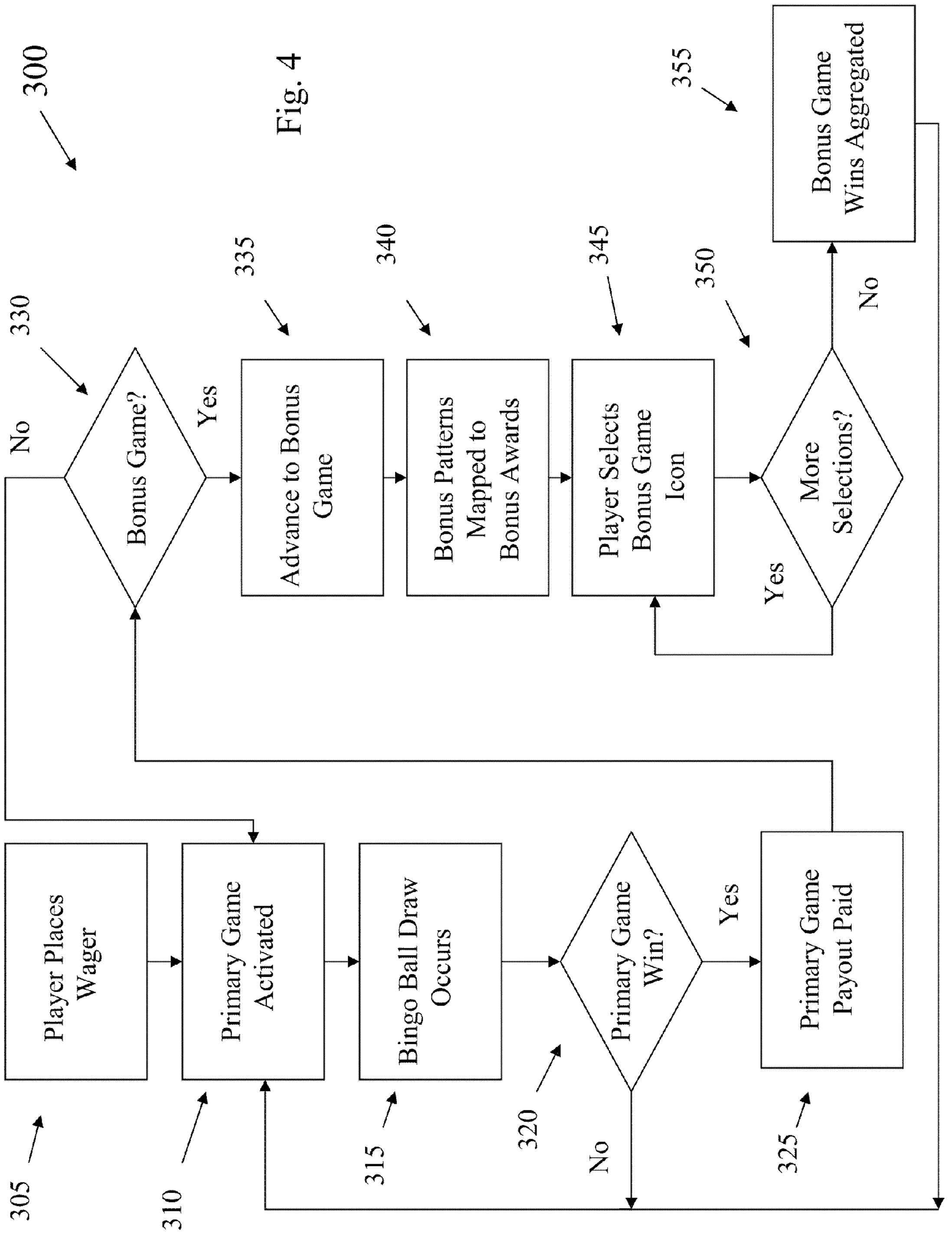
FIG. 4 illustrates a flow detailing one methodology according to the embodiments of the present invention.

FIGS. 2*a*-2*d* shows an exemplary pick type bonus game display 200 according to the embodiments of the present invention. The pick type bonus game displays ten different award icons in the form of balloons 210-1 through 210-8 for the player to select. The player is permitted to select one or more award balloons 210-1 through 210-8 depending on the reel game outcome. FIG. 2*b* shows the display after the player has selected a first award balloon 210-4 revealing a 50 unit award. As depicted in FIG. 4, prior to the player selecting any award balloons, the set of bonus game patterns is mapped to the set of bonus game awards by the order that the individual patterns in the set of bonus game patterns are achieved by applying the original ball draw, in the order the balls were originally drawn, to the original bingo card. The bonus game patterns are then randomly assigned to the bonus game icons (balloons). As shown in FIG. 4, 10 bingo patterns 225-1 through 225-10 are generated based on the original ball draw and the original bingo card. Thus, bingo pattern 225-1 is a first pattern generated by the original ball draw, bingo pattern, 225-2 is a second pattern generated by the original ball draw and so on. Each successive bingo pattern beginning with bingo pattern 225-1 is assigned a bonus amount 230-1 through 230-10. The patterns 225-1 through 225-10 and corresponding bonus awards 230-1 through 230-10 are randomly assigned to a bonus icon (balloons in this example). In this manner, the bonus game is driven by the original ball draw and original bingo card which triggered advancement to the bonus game.

Figure 2C:
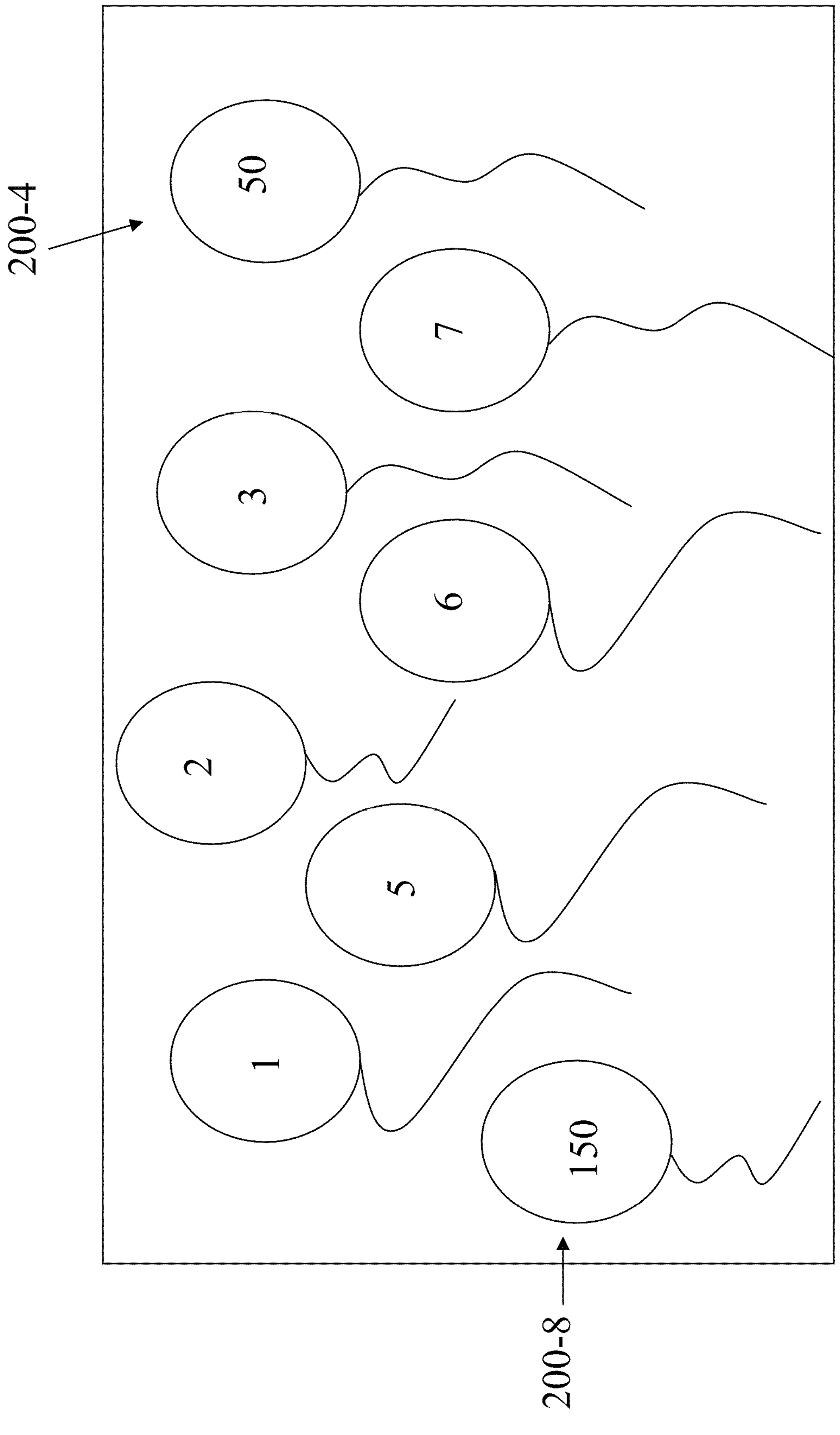
Figure 2D:
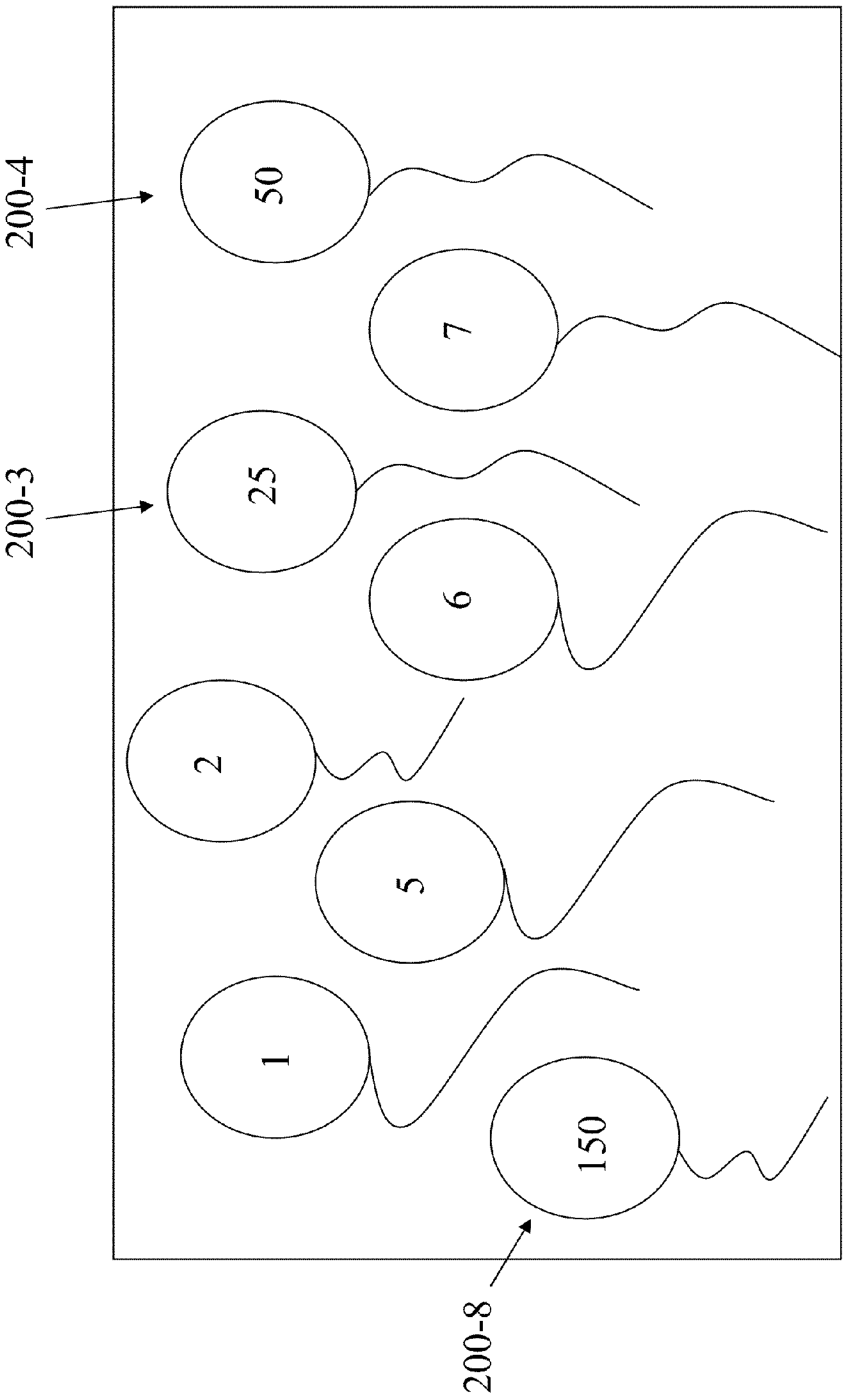
Figure 3:
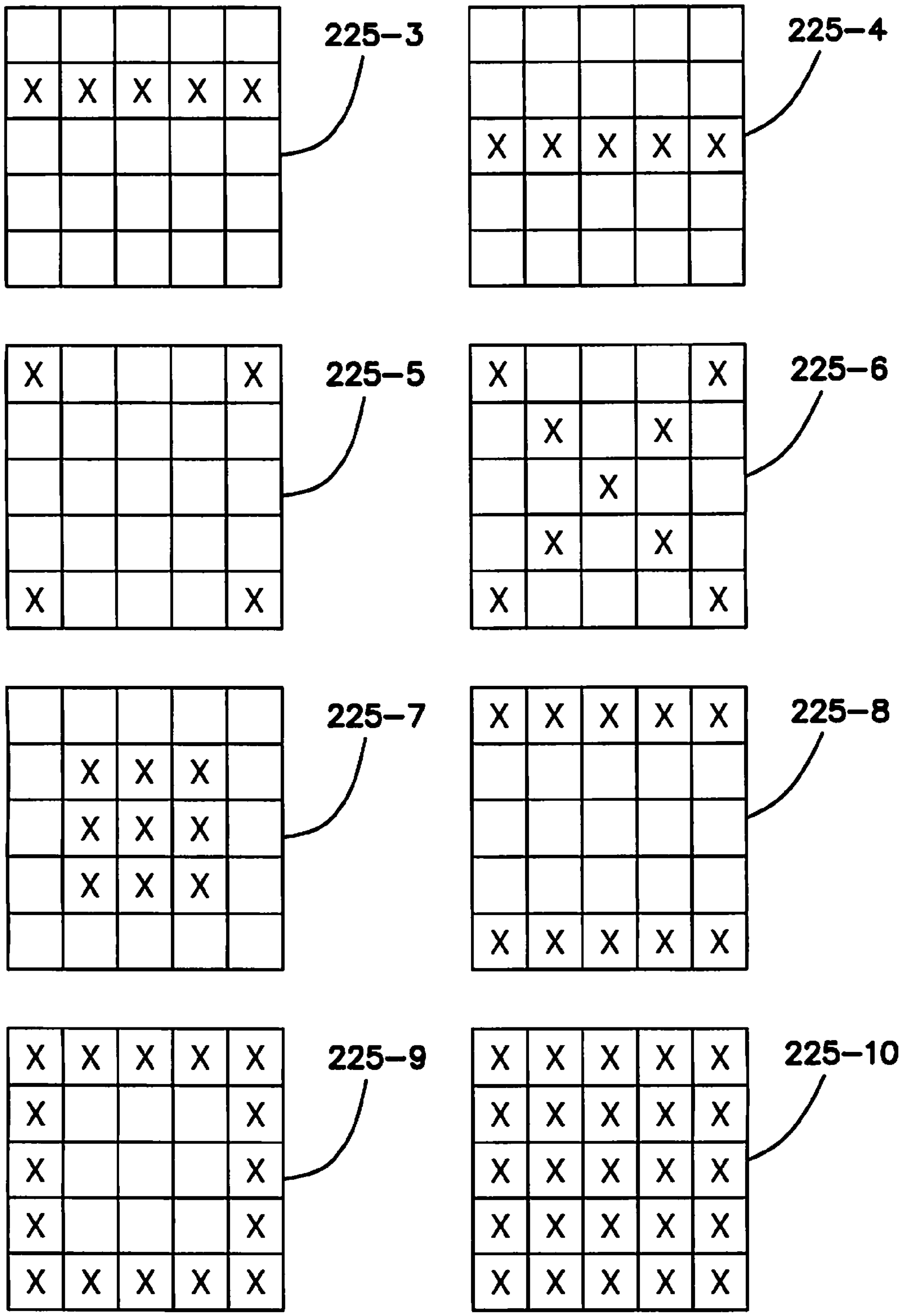

Responsive to the player selecting award balloon 210-4, the bonus game pattern assigned to balloon 210-4 determines the award—50 units in this instance. FIG. 2*c* shows the display after the player has selected a second award balloon 210-8 revealing a 150 unit award. Again, responsive to the player selecting award balloon 210-8, the bonus game pattern assigned to balloon 210-8 determines the award—150 units in this instance. FIG. 2*d* shows the display after the player has selected a third award balloon 210-3 revealing a 25 unit award. Again, responsive to the player selecting award balloon 210-3, the bonus game pattern assigned to balloon 210-3 determines the award—25 units in this instance. In this manner, the bonus awards are determined by the bonus game patterns selected by the player.

The use of the original bingo card and the original ball draw precludes the need for any additional bingo ball draws or bingo cards.

Figure 3:
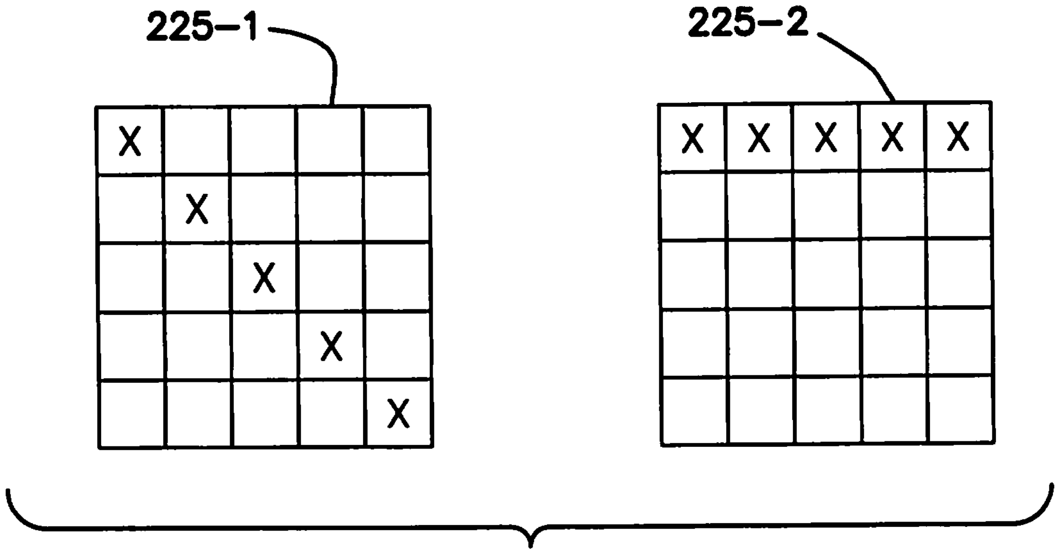
FIG. 3 illustrates a series of bingo patterns and corresponding bonus bingo awards according to the embodiments of the present invention.

FIG. 3 shows a flow chart 300 detailing one methodology of playing a game having a pick style bonus game according to the embodiments of the present invention. At 305, a player places a wager. The wager may be in the form of cash (e.g., currency or coins), bar-coded tickets or credits deducted from the credit meter. At 310, the primary game is activated. At 315, a bingo ball draw is conducted. At 320, it is determined if a bingo card pattern generated by the bingo ball draw results in a primary game win. If not, the chart loops back to 310. If a primary game win does occur at 320, at 325, the primary game payout is paid. At 330, it is determined if the primary game win is of a pre-determined type that advances the player to a bonus game. If so, at 335, the game advances to the bonus game. At 340, a set of bonus game patterns is mapped to the set of bonus game awards by an order that the bonus game patterns forming the set of bonus game patterns are achieved by applying an original ball draw, in an order bingo balls were originally drawn, to an original bingo card, and randomly assigning the bonus game patterns to the bonus game icons. At 345, the player is allowed to select a bonus game icon and responsive to the selection of each bonus game icon, a corresponding award is displayed. In this embodiment, each bonus game icon has a corresponding bonus award resulting in a win. Alternatively, one or more bonus game icons have no award, which if selected, result in no award. At 350, it is determined if the player has completed the number of bonus game icon selections. If not, the chart 300 loops back to 345. If so, at 355 a total bonus award is calculated and the chart 300 loops back to 310.

Although the invention has been described in detail with reference to several embodiments, additional variations and modifications exist within the scope and spirit of the invention as described and defined in the following claims.

I claim:

1. An electronically implemented gaming device comprising:

a video-based primary game configured to present a game of chance wherein outcomes of the game of chance are based on bingo ball draws and patterns formed on bingo cards; and a video-based bonus game activated by certain pre-established primary game outcomes, the bonus game configured to present one or more bonus game icons each associated with a separate bonus game award from a set of bonus game awards wherein each bonus game award is determined by:

mapping a set of bonus game patterns to the set of bonus game awards by an order that bonus game patterns forming the set of bonus game patterns are achieved by applying an original ball draw, in an order that each of the bingo balls were originally drawn, to an original bingo card, and randomly assigning the bonus game patterns to the one or more bonus game icons.

2. The gaming device of claim 1, wherein the video-based bonus game is at least one of a pick type game, a wheel type game, and a race type game.

3. The gaming device of claim 1, further comprising a communication device configured to communicate with a central computer system.

4. A method of configuring a gaming device comprising:

configuring a video-based primary game to present a game of chance wherein outcomes of the game of chance are based on bingo ball draws and patterns formed on bingo cards;

and configuring a video-based bonus game to activate responsive to certain pre-established primary game outcomes, further configuring the bonus game to present one or more bonus game icons each associated with a separate bonus game award from a set of bonus game awards wherein each bonus game award is determined by:

mapping a set of bonus game patterns to the set of bonus game awards by an order that bonus game patterns forming the set of bonus game patterns are achieved by applying an original ball draw, in an order that each of the bingo balls were originally drawn, to an original bingo card, and randomly assigning the bonus game patterns to the one or more bonus game icons.

5. The method of claim 4, further comprising utilizing at least one of a pick type game, a wheel type game, and a race type game as the video-based bonus game.

6. A method of operating a gaming device comprising:

presenting a primary game of chance wherein outcomes of said game of chance are based on bingo ball draws and patterns formed on bingo cards; and activating a video-based bonus game responsive to certain pre-established primary game outcomes, upon activating the video-based bonus game presenting one or more bonus game icons each associated with a separate bonus game award from a set of bonus game awards wherein each bonus game award is determined by:

mapping a set of bonus game patterns to the set of bonus game awards by an order that bonus game patterns forming the set of bonus game patterns are achieved by applying an original ball draw, in an order that each of the bingo balls were originally drawn, to an original bingo card, and randomly assigning the bonus game patterns to the one or more bonus game icons.

7. The method of claim 6, further comprising utilizing at least one of a pick type game, a wheel type game, and a race type game as the bonus game.

* * * * *